United States Patent [19]

Kudo

[11] Patent Number: 5,646,229

[45] Date of Patent: Jul. 8, 1997

[54] COMPOSTIONS FOR MOISTURE CURING HOT MELT ADHESIVES

[75] Inventor: Kazuho Kudo, Shiga-ken, Japan

[73] Assignee: Sekisui Kagaku Kogyo Kabushiki Kaisha, Osaka, Japan

[21] Appl. No.: 643,526

[22] Filed: May 6, 1996

Related U.S. Application Data

[63] Continuation of Ser. No. 272,121, Jul. 8, 1994, abandoned, which is a continuation of Ser. No. 937,855, filed as PCT/JP92/00428, Apr. 6, 1992 published as WO92/17556, Oct. 15, 1992, abandoned.

[30] Foreign Application Priority Data

Apr. 8, 1991 [JP] Japan ........................... 3-75161

[51] Int. Cl.$^6$ .................... C08G 18/00; C08G 18/08; C08G 18/18
[52] U.S. Cl. .................... 528/53; 528/44
[58] Field of Search .................... 528/53

[56] References Cited

U.S. PATENT DOCUMENTS

| | | | |
|---|---|---|---|
| 4,379,861 | 4/1983 | Haas et al. | 528/53 |
| 4,404,352 | 9/1983 | Suenobu et al. | 528/45 |
| 4,430,468 | 2/1984 | Schumacher | 524/563 |
| 4,574,793 | 3/1986 | Lee et al. | 528/53 |
| 5,064,957 | 11/1991 | Nakasugi | 528/53 |
| 5,091,444 | 2/1992 | Bauer et al. | 524/871 |

FOREIGN PATENT DOCUMENTS

| | | |
|---|---|---|
| 054219A1 | 6/1982 | European Pat. Off. . |
| 0054219A1 | 6/1982 | European Pat. Off. . |
| 2123372 | 9/1972 | France . |
| 4008359 | 1/1991 | Germany . |
| 4008359A1 | 1/1991 | Germany . |
| 57-123214 | 7/1982 | Japan . |
| 58-13618 | 1/1983 | Japan . |

*Primary Examiner*—Paul R. Michl
*Assistant Examiner*—Patrick Niland
*Attorney, Agent, or Firm*—Armstrong, Westerman, Hattori, McLeland & Naughton

[57] ABSTRACT

The present invention has for its object to obtain a composition for moisture curing hot melt adhesives superior in both moisture curing reactivity after adhesion and thermal stability in the use.

The composition for moisture curing hot melt adhesives according to the present invention is characterized by containing a urethane prepolymer having isocyanate group in its end and a compound having a structure represented by the following formula (I):

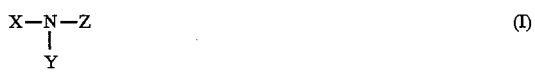

(where X, Y and Z in the formula (I) are alkyl groups or groups represented by the following formula (II), and at least one of X, Y and Z is a group represented by the formula (II):

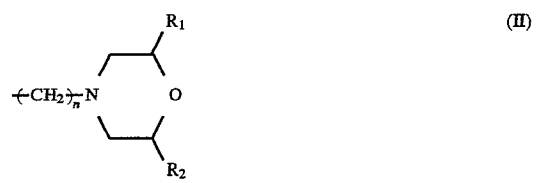

n in the formula (II) is an integer from 1 through 10, and $R_1$ and $R_2$ are hydrogen or alkyl groups.)

22 Claims, 1 Drawing Sheet

COMPOSITIONS FOR MOISTURE CURING HOT MELT ADHESIVES

This application is a continuation of application Ser. No. 08/272,121 filed Jul. 8, 1994, now abandoned; which is a continuation of application Ser. No. 07/937,855 filed Oct. 15, 1992, now abandoned; which is a national stage application Under § 3.71 of International Application PCT/JP92/00428 filed Apr. 6, 1992.

TECHNICAL FIELD

The present invention relates generally to compositions for moisture curing hot melt adhesives using a urethane prepolymer, and more particularly, to compositions for moisture curing hot melt adhesives exhibiting superior thermal stability and initial adhesive strength.

BACKGROUND ART

Moisture curing hot melt adhesives composed of a urethane prepolymer having an isocyanate group in its end have been conventionally known. For example, Japanese Patent Laid-Open Gazette No. 189486/1988 and Japanese Patent Laid-Open Gazette No. 284577/1989 disclose moisture curing hot melt adhesives using a urethane prepolymer which are superior in initial adhesive strength.

Furthermore, it has been known that an organic metal compounds such as dibutyltin dilaurate or tin octate or a tertiary amine compounds such as triethylamine or triethylenediamine is added as a catalyst to this type of moisture curing hot melt adhesives.

The initial heat resistance of the above described moisture curing adhesives composed of the urethane prepolymer depends on the softening point similarly to a case of ordinary hot melt adhesives. Thus, it takes a very long period for the adhesives to exhibit practical heat resistance with progress of polymerization due to moisture curing. Consequently, an adherend must be subjected to aging for two to three days after adhesion. As a result, in the conventional adhesives disclosed in the above described prior art, the adherend must be aged for a long time, so that the productivity of a bonding operation cannot be sufficiently increased, which is uneconomical.

On the other hand, if the above described catalyst composed of organic metal compounds or the like is added, the moisture curing characteristics of the adhesives can be enhanced, thereby to make it possible to shorten a curing time period. However, if the catalyst composed of the organic metal compounds or the like is added, the thermal stability of the adhesives is significantly lowered, so that the adhesives may, in some cases, be gelled in a coating machine.

More specifically, in the conventional moisture curing hot melt adhesives composed of the urethane prepolymer, both the curing speed and the thermal stability cannot be made adequate, so that the improvements have been required.

OBJECT OF THE INVENTION

The present invention has been made so as to satisfy the above described requirements and has for its object to provide compositions for moisture curing hot melt adhesives superior in reactivity with moisture, exhibiting sufficient thermal resistance in a short time after adhesion, and also superior in thermal stability in the use.

DISCLOSURE OF THE INVENTION

As a result of zealously examining moisture curing hot melt adhesives using a urethane prepolymer which satisfy the above described requirements, the inventors of the present application have found that the above described requirements can be satisfied if compounds having a particular structure are used as a catalyst, to reach the present invention.

In accordance with a broad aspect of the present invention, there is provided a composition for moisture curing hot melt adhesives which is characterized by containing a urethane prepolymer having isocyanate group in its end and a compound having a structure represented by the following formula (I):

In the formula (I), X, Y and Z are alkyl groups or groups represented by the following formula (II), and at least one of X, Y and Z is a group represented by the following formula (II):

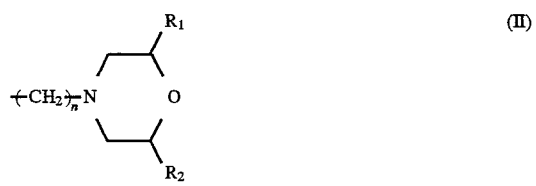

In the formula (II), n is an integer from 1 through 10, and $R_1$ and $R_2$ are alkyl groups or hydrogen.

Furthermore, in accordance with another broad aspect of the present invention, there is provided a composition for moisture curing hot melt adhesives which is characterized by containing a urethane prepolymer having an isocyanate group in its end, a tackifying resin, and a compound having a structure represented by the foregoing formula (I).

In accordance with still another broad aspect of the present invention, there is provided a composition for moisture curing hot melt adhesives which is characterized by containing a urethane prepolymer having isocyanate group in its end, a tackifying resin, a thermoplastic polymer, and a compound having a structure represented by the foregoing formula (I).

The components of the composition for moisture curing hot melt adhesives according to the present invention will be described in detail.

Urethane Prepolymer

A urethane prepolymer used in the present invention is a urethane prepolymer having an isocyanate group in its end which is obtained by the addition reaction of polyols having a hydroxyl group or groups in its molecular end and polyisocyanates having an isocyanate group or groups in its molecular end.

As the above described polyols, conventionally known polyols generally used for the manufacture of polyurethane can be used. Examples of such polyols include polyester polyols, polyether polyols, polyalkylene polyols, and polycarbonate polyols.

More specifically, examples of the above described polyester polyols include polyester polyols obtained by the reaction of terephthalic acid, isophthalic acid, 1,5-naphthalic acid, 2,6-naphthalic acid, succinic acid, glutaric acid, adipic acid, picric acid, suberic acid, azelaic acid, sebacic acid, or dicarboxylic acids such as decamethylene dicarboxylic acid or dodecamethylene dicarboxylic acid and diols such as ethylene glycol, propylene glycol, 1,3-propanediol, 1,4- butanediol, neopentyl glycol, 1,5-pentanediol, 1,6-hexanediol, diethylene glycol or cyclohexanediol; and poly-ε-caprolactone-polyol obtained by ring-opening polymerization of ε-caprolactam. Examples of the above described polyether polyols include polyethylene glycol, polypropylene glycol, and polytetramethylene glycol. Examples of the above described polyalkylene polyol include polybutadiene polyol, polybutadiene polyol hydride, and polyisoprene polyol hydride. Examples of the above described polycarbonate polyols include polyhexamethylene carbonate polyol, and polycyclohexane dimethylene carbonate polyol. The above described types of polyols may be used alone or in combination.

Furthermore, examples of the above described polyisocyanate include tolylene diisocyanate, diphenylmethane diisocyanate, liquid denatured matter of diphenylmethane diisocyanate, hexamethylene diisocyanate, xylylene diisocyanate, cyclohexane phenylene diisocyanate, and naphthalene-1,5-diisocyanate.

Compound having Structure Represented by Formula (I)

In the present invention, a compound having a structure represented by the formula (I) is added as a catalyst to the above described urethane prepolymer having isocyanate group or groups in its end. This compound is a tertiary amine catalyst, as apparent from the above described formula (I). The use of the catalyst makes it possible to obtain properties which are not obtained when the conventional catalyst is used. More specifically, both the moisture curing reactivity and the thermal stability are significantly enhanced by using the catalyst.

Examples of the compound having the structure represented by the formula (I) include bis(2-(2,6-dimethyl-4-morpholino) ethyl)-(2-(4-morpholino) ethyl) amine, bis(2-(2,6-dimethyl-4-morpholino) ethyl)-(2-(2,6-diethyl-4-morpholino) ethyl) amine, tris(2-(4-morpholino) ethyl) amine, tris(2-(4-morpholino) propyl) amine, tris(2-(4-morpholino) butyl) amine, tris(2-(2,6-dimethyl-4-morpholino) ethyl) amine, tris(2-(2,6-diethyl-4-morpholino) ethyl) amine, tris(2-(2-methyl-4-morpholino) ethyl) amine or tris(2-(2-ethyl-4-morpholino) ethyl) amine.

The amount of addition of the compound having the structure represented by the formula (I) is in the range of 0.01 to 5 parts by weight and preferably, in the range of 0.1 to 2 parts by weight as the amount converted into the structure represented by the formula (I) per 100 parts by weight of a urethane prepolymer. The effect of accelerating the moisture curing reaction is not sufficiently obtained if the amount of addition is less than 0.01 parts by weight, while the thermal stability is lowered so that the adhesives may, in some cases, be gelled in the use if the amount of addition exceeds 5 parts by weight, which is not preferable.

The range of the amount of addition of the compound having the structure represented by the above described formula (I) varies depending on the type of polyol used for obtaining a urethane prepolymer. More specifically, it is preferable that the amount of addition of the compound having the structure represented by the above described formula (I) is in the range of 0.01 to 2 parts by weight per 100 parts by weight of a urethane prepolymer which is obtained using, for example, polyester polyol, while being in the range of 0.05 to 5 parts by weight per 100 parts by weight of a urethane prepolymer which is obtained using, for example, polyalkylene polyol.

In either case, the amount of addition of the compound having the structure represented by the formula (I) is determined to a suitable range by experiments depending on the type of a urethane prepolymer used.

Tackifying Resin

As described in the foregoing, in accordance with another broad aspect of the present invention, a tackifying resin is contained in addition to the above described urethane prepolymer and compound having the structure represented by the formula (I).

The above described tackifying resin gives superior initial adhesive properties to the moisture curing type hot melt adhesives according to the present invention in cooperation with other adhesive components. Examples of the tackifying resin usable include rosin type resin, terpene type resin, aliphatic petroleum resin, cycloaliphatic petroleum resin or aromatic petroleum resin and preferably, one whose ring and ball softening point is 80° to 150° C.

The types of tackifying resins may be used alone or in combination.

The amount of the above described tackifying resin is in the range of 5 to 200 parts by weight and preferably, in the range of 10 to 100 parts by weight per 100 parts by weight of a urethane prepolymer. The reason for this is that sufficient initial adhesive properties cannot be given to the composition for moisture curing type hot melt adhesives when the amount of the tackifying resin is less than 5 parts by weight, while the adhesives become weak and particularly, are liable to be lacking in adhesive properties under a low temperature when it exceeds 200 parts by weight.

Thermoplastic Polymer

In accordance with still another aspect of the present invention, a thermoplastic polymer is contained in addition to the above described urethane prepolymer, compound having the structure represented by the formula (I), and tackifying resin.

The above described thermoplastic polymer gives superior initial adhesive properties and heat resistance to the composition for moisture curing hot melt adhesives according to the present invention in cooperation with other components.

Preferable examples of the above described thermoplastic polymer include an A-(B-A)n block copolymer (where n is a number in the range of 1 to 50) or an A-B radial block copolymer when A is taken as a polystyrene block and B is taken as a rubber block. The above described A, that is, the polystyrene block contains a block unit containing polystyrene, poly α-methylstyrene and another similar aromatic monomer. In addition, B, that is, the rubber block may be hydrogenated or may not be hydrogenated and contains isoprene, butadiene, another monomer capable of forming a rubbery polymer block, and a polymer manufactured from a repeated unit induced from their mixtures.

Specific examples of such an A-(B-A)n block copolymer or an A-B radial block copolymer include a styrene-butadiene-styrene copolymer (hereinafter abbreviated as SBS), a styrene-isoprene-styrene copolymer (SIS), and a styrene-ethylene-butylene-styrene copolymer (SEBS). In addition, preferable other examples of the above described thermoplastic polymer include a vinyl polymer containing an ethylene-vinyl monomer copolymer whose melt index is approximately 0.1 to 1000 and which contains approximately 10 to 40% by weight of a vinyl monomer or a vinyl polymer containing 20 to 50% by weight of a vinyl monomer, 40 to 77% by weight of ethylene, and 3 to 20% by weight of carbon monooxide. Examples of this type of vinyl polymer include an ethylene-vinyl acetate copolymer (hereinafter abbreviated as EVA). In addition, the above described vinyl monomer includes an acrylate monomer or a vinyl ester monomer of a carboxylic acid compound. Examples of the above described vinyl polymer containing an acrylate monomer as a vinyl monomer include an ethylene-acrylic ester copolymer, an ethylene-methacrylic acid copolymer or the like.

Still other examples of the thermoplastic polymer used in the present invention include a polyolefin polymer such as atactic polypropylene (hereinafter abbreviated as APP) or an ethylene-α-olefin copolymer.

Meanwhile, the above described various types of thermoplastic polymers may be used alone or in combination.

The amount of the above described thermoplastic polymer is generally in the range of 10 to 100 parts by weight per 100 parts by weight of a urethane prepolymer.

The reason for this is that flexible and sufficient initial adhesive properties (adhesive strength immediately after adhesion which is not dependent on moisture curing) cannot be given to the composition for moisture curing hot melt adhesives according to the present invention when the amount of the thermoplastic polymer is less than 10 parts by weight, while the adhesives cannot be applied unless the adhesives are heated to not less than 140° C., which significantly causes deterioration of the thermal stability of the adhesives because the melting viscosity of the adhesives is increased if the amount of the thermoplastic polymer exceeds 100 parts by weight.

Other Additives

Other additives, for example, waxes such as paraffin wax or microcrystalline wax, inorganic and organic fillers, various oils or coloring agents may be suitably added within the range in which an object of the present invention is achieved to the composition for moisture curing hot melt adhesives according to the present invention.

According to the present invention, the compound having the structure represented by the formula (I) is added as a catalyst to the urethane prepolymer having an isocyanate group in its end. Accordingly, both the moisture curing reactivity and the thermal stability in the use are effectively enhanced. Consequently, if the composition for adhesives according to the present invention is used, sufficient heat resistance and adhesive strength are achieved without aging an adherend for a long time.

Accordingly, even if the composition for moisture curing hot melt adhesives according to the present invention is used in the field in which heat resistance is required, adhesion is possible in a short time, thereby to make it possible to significantly increase the productivity of a bonding operation.

BEST MODE FOR CARRYING OUT THE INVENTION

Figure 1:
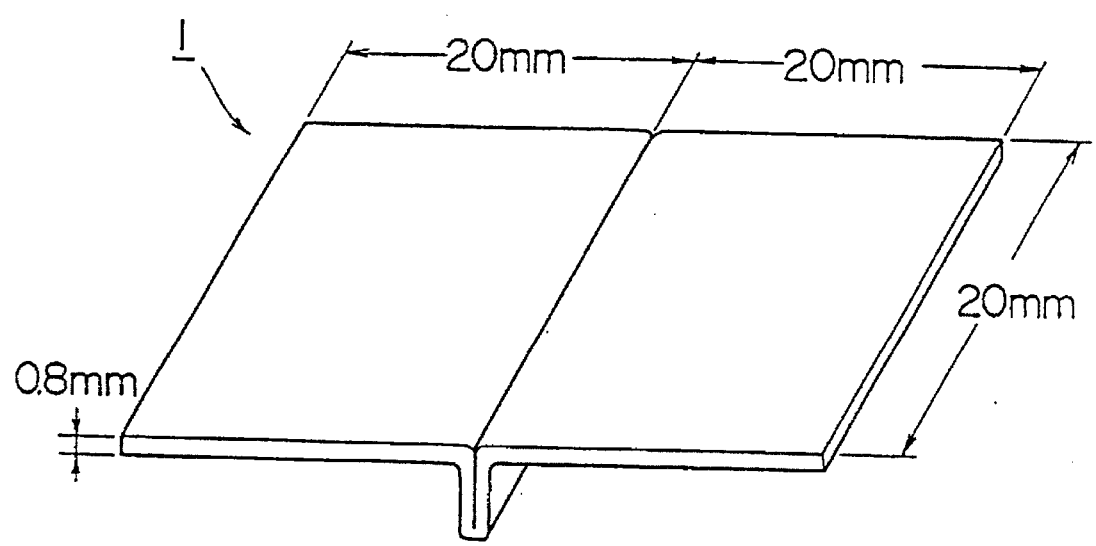
FIGURE 1 is a perspective view illustrating a pentite steel plate used in a heat-resistant creep test at 80° C. of compositions for moisture curing hot melt adhesives in examples and comparative examples.

The present invention will be made clear by explaining non-restrictive examples and comparative examples of the present invention.

EXAMPLE 1

200 parts by weight of polyalkylene polyol (POLYTAIL HA (trade name) manufactured by Mitsubishi Chemical Industries, Ltd.) and 52 parts by weight of diphenylmethane diisocyanate (MDI)) are mixed with each other at a temperature of 100° C. and are reacted with each other in an atmosphere of nitrogen for three hours, to obtain a urethane prepolymer (1). 30 parts by weight of saturated alicyclic hydrocarbon resin (ARKON P-125 (trade name) manufactured by Arakawa Chemical Industries, Ltd.) and a catalyst having a structure represented by the following formula (III) or (IV) are added to 100 parts by weight of the urethane prepolymer (1) obtained and are hot melt mixed with each other at a temperature of 150° C. and then, a mixture obtained is vacuum deaerated, thereby to obtain a composition for moisture curing hot melt adhesives.

Meanwhile, the amount of addition of the catalyst represented by the formula (III) or (IV) is changed as shown in the table 1 described hereafter, thereby to obtain four types of compositions for moisture curing hot melt adhesives in examples 1-a, 1-b, 1-c and 1-d.

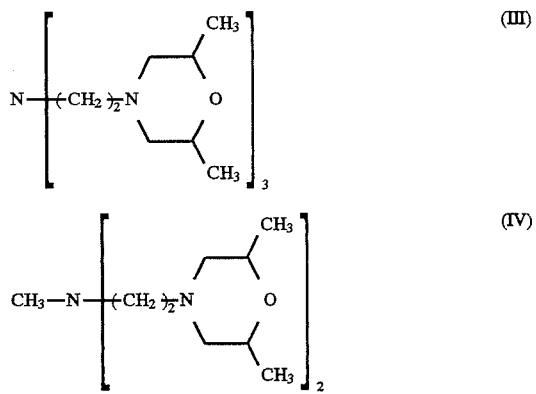

COMPARATIVE EXAMPLE 1

Four types of compositions for moisture curing type hot melt adhesives in comparative examples 1-a, 1-b, 1-c and 1-d are obtained as shown in the table 1 described hereafter in the same manner as the example 1 except that dibutyl tin dilaurate (DBTDL), stannous octoate (SnOct), triethylenediamine (TEDA), pentamethyl diethylenetriamine (PMDETA) are respectively used as catalysts.

EXAMPLE 2

200 parts by weight of polytetramethylene adipate and 30 parts by weight of diphenylmethane diisocyanate (MDI) are mixed with each other at a temperature of 100° C. and are reacted with each other in an atmosphere of nitrogen for three hours, to obtain a urethane prepolymer (2). 50 parts by weight of terpene-styrene resin (YS RESIN TO-125 (trade name) manufactured by Yasuhara Chemical Co., Ltd.), 20 parts by weight of an α-olefin copolymer (BEST PLAST 708 (trade name) manufactured by Hüles Co., Ltd.), and 0.4 parts by weight of the catalyst represented by the formula (III) are hot mixed with 100 parts by weight of the urethane prepolymer (2) obtained at a temperature of 150° C. and then, a mixture obtained is vacuum deaerated, thereby to obtain a composition for moisture curing hot melt adhesives.

COMPARATIVE EXAMPLE 2

A composition for moisture curing hot melt adhesives in a comparative example 2 is obtained in exactly the same manner as the example 2 except that the catalyst having the structure represented by the formula (III) is not added.

TABLE 1

|  | Example | | | | Example | Comparative Example | | | | Comparative Example |
| --- | --- | --- | --- | --- | --- | --- | --- | --- | --- | --- |
|  | 1-a | 1-b | 1-c | 1-d | 2 | 1-a | 1-b | 1-c | 1-d | 2 |
| Urethane Prepolymer (1) | 100 | 100 | 100 | 100 |  | 100 | 100 | 100 | 100 |  |
| Urethane Prepolymer (2) |  |  |  |  | 100 |  |  |  |  | 100 |
| <Tackifying Resin> |  |  |  |  |  |  |  |  |  |  |
| ARKON P-125 | 30 | 30 | 30 | 30 |  | 30 | 30 | 30 | 30 |  |
| YS RESIN TO-125 |  |  |  |  | 50 |  |  |  |  | 50 |
| <Thermoplastic Polymer> |  |  |  |  |  |  |  |  |  |  |
| BESTPLAST 708 |  |  |  |  | 20 |  |  |  |  | 20 |
| Catalyst |  |  |  |  |  |  |  |  |  |  |
| Catalyst of Formula (III) | 0.1 | 0.5 | 2.0 |  | 0.5 |  |  |  |  |  |
| Catalyst of Formula (IV) |  |  |  | 0.5 |  |  |  |  |  |  |
| DBTDL |  |  |  |  |  | 0.5 |  |  |  |  |
| SnOct |  |  |  |  |  |  | 0.5 |  |  |  |
| TEDA |  |  |  |  |  |  |  | 0.5 |  |  |
| PMDETA |  |  |  |  |  |  |  |  | 0.5 |  |
| Moisture Curing Property | △ | ◎ | ◎ | ○ | ◎ | × | △ | — | — | × |
| Thermal Stability | ◎ | ◎ | △ | ◎ | ◎ | △ | × | — | — | ◎ |

EVALUATION OF EXAMPLES 1-a TO 2 AND COMPARATIVE EXAMPLES 1-a TO 2

A plate made of ABS resin having dimensions of 4 cm by 5 cm by 0.3 cm thick is spray-coated with each of the compositions for moisture curing hot melt adhesives in the examples 1-a to 1-d and the example 2 as well as the comparative examples 1-a to 1-d and the comparative example 2 obtained in the above described manner such that the amount of coating is 50 g/m². The above described plate made of ABS resin is then bonded to a pentite steel plate having a shape and dimensions shown in FIGURE 1. A bond sample is cured in an atmosphere of a temperature of 20° C. and 65 percent relative humidity, the bond surface is kept horizontal with the pentite steel plate on the bottom, a suspension load of 100 g is applied to the pentite steel plate, and heat-resistant creep at a temperature of 80° C. under the load of 100 g is measured. A curing time period required until cohesive failure does not occur in the adhesives is considered as an index of moisture curing characteristics.

Furthermore, after putting each of the compositions for moisture curing hot melt adhesives in the examples and the comparative examples in a sealed aluminum cartridge and heating the same at a temperature of 130° C. for eight hours, the rate of viscosity increase (%) is measured and the same is used as an index of thermal stability.

The results of the moisture curing property and the thermal stability measured in the above described manner are also shown in the table 1. Respective meanings of signs in the table 1 are as shown in the following table 2.

TABLE 2

|  | Moisture Curing Property (Hour) | Heat Stability (%) |
| --- | --- | --- |
| ◎ | less than 4 | less than 10 |
| ○ | 4 to less than 12 | 10 to less than 50 |
| △ | 12 to less than 24 | 50 to less than 100 |
| × | 24 or more | 100 |

As obvious from the table 1, the compositions for moisture curing hot melt adhesives in the examples 1-a to 1-d and the example 2 exhibit sufficiently superior moisture curing property and thermal stability. On the other hand, the compositions for moisture curing hot melt adhesives in the comparative example 1-a and the comparative example 2 are significantly inferior in moisture curing property, while the composition for moisture curing hot melt adhesives in the comparative example 1-b is significantly inferior in thermal stability. Meanwhile, in each of the compositions for moisture curing type hot melt adhesives in the comparative examples 1-c and 1-d, the catalyst evaporates at the time of mixing adhesives, so that the above described respective evaluations cannot be carried out.

EXAMPLE 3

50 parts by weight of saturated alicyclic hydrocarbon resin (ARKON P-125 (trade name) manufactured by Arakawa Chemical Industries, Ltd.) and 30 parts by weight of an α-olefin copolymer (BEST PLAST 708 (trade name) manufactured by Hüles Co., Ltd.) are melt mixed with each other at a temperature of 150° C., and 100 parts by weight of a urethane prepolymer (1) obtained in the example 1 and the catalyst having the structure represented by the formula (III) shown in the example 1 are further added to a mixture obtained and are agitated for thirty minutes while being vacuum deaerated, thereby to obtain a composition for moisture curing hot melt adhesives.

The amount of addition of the catalyst represented by the formula (III) is changed as shown in the following table 3, thereby to obtain three types of compositions for moisture curing hot melt adhesives in examples 3-a, 3-b and 3-c.

COMPARATIVE EXAMPLE 3

Four types of compositions for moisture curing hot melt adhesives in comparative examples 3-a, 3-b, 3-c and 3-d are obtained as shown in the following table 4 in the same manner as the example 3 except that dibutyltin dilaurate (DBTDL), stannous octoate (SnOct), triethylenediamine (TEDA), pentamethyl diethylenetriamine (PMDETA) are respectively used as catalysts.

EXAMPLE 4

80 parts by weight of hydrogenated terpene resin (CLEARON P-115 (trade name) manufactured by Yasuhara Chemical Co., Ltd.) and 80 parts by weight of ethylene-ethyl acrylate resin (EEA-704 (trade name) manufactured by Dupont-Mitsui Polychemicals Co., Ltd.) are melt mixed with each other at a temperature of 150° C., and 100 parts by weight of a urethane prepolymer (1) obtained in the example 1 and 0.5 parts by weight of the catalyst having the structure represented by the foregoing formula (III) are Further added to a mixture obtained and are agitated for thirty minutes while being vacuum deaerated, thereby to obtain a composition For moisture curing hot melt adhesives.

EXAMPLE 5

50 parts by weight of styrene system hydrocarbon resin (FTR-6100 (trade name) manufactured by Mitsui Petrochemical Industries, Ltd.) and 20 parts by weight of an ethylene-butyl acrylate-carbon monooxide copolymer (EP-4043 (trade name) manufactured by Dupont Co., Ltd.) are melt mixed with each other at a temperature of 150° C., and 100 parts by weight of the urethane prepolymer (1) obtained in the example 1 and 0.4 parts by weight of the catalyst having the structure represented by the formula (IV) shown in the example 1 are further added to a mixture obtained and are agitated for thirty minutes while being vacuum deaerated, thereby to obtain a composition for moisture curing type hot melt adhesives.

EXAMPLE 6

100 parts by weight of saturated alicyclic hydrocarbon resin (ARKON P-100 (trade name) manufactured by Arakawa Chemical Industries, Ltd.) and 30 parts by weight of SEBS as the thermoplastic elastomer (CRATON G-1726 (trade name) manufactured by Shell Kagaku K.K.) are thoroughly mixed with each other at a temperature of 140° C. using a double arm mixer, and 100 parts by weight of the urethane prepolymer (1) obtained in the example 1 and 0.3 parts by weight of the catalyst having the structure represented by the foregoing formula (IV) are further added to a mixture obtained and are agitated for thirty minutes while being vacuum deaerated, thereby to obtain a composition for moisture curing type hot melt adhesives.

EXAMPLE 7

10 parts by weight of disproportionated rosin ester resin (SUPER ESTER A-100 (trade name) manufactured by Arakawa Chemical Industries, Ltd.) is hot melted, and 100 parts by weight of the urethane prepolymer (2) obtained in the example 2 and 0.3 parts by weight of the catalyst represented by the foregoing formula (III) are further melt mixed with the melted rosin ester resin and are vacuum deaerated at a temperature of 130° C., to obtain a composition for moisture curing type hot melt adhesives.

COMPARATIVE EXAMPLE 4

A composition for moisture curing hot melt adhesives is obtained in the same manner as the example 7 except that no catalyst is added.

EXAMPLE 8

200 parts by weight of polytetrametylene glycol and 35 parts by weight of diphenylmethane diisocyanate (MDI) are mixed with each other at a temperature of 80° C. and are reacted with each other under an atmosphere of nitrogen for four hours, to obtain a urethane prepolymer (3).

80 parts by weight of disproportionated rosin ester resin (SUPER ESTER A-100 (trade name) manufactured by Arakawa Chemical Industries, Ltd.) is hot melted, and 100 parts by weight of the urethane prepolymer (3) and 0.4 parts by weight of the catalyst represented by the foregoing formula (IV) are melt mixed with the rosin ester resin and are vacuum deaerated at a temperature of 130° C., to obtain a composition for moisture curing hot melt adhesives.

COMPARATIVE EXAMPLE 5

A composition for moisture curing type hot melt adhesives is obtained in the same manner as the example 8 except that the amount of a catalyst is 6.0 parts by weight.

EVALUATION OF EXAMPLES 3 TO 8 AND COMPARATIVE EXAMPLES 3 TO 5

The evaluations of moisture curing property and thermal stability are carried out in the same manner as the examples 1 and 2 and the comparative examples 1 and 2 with respect to each of the composition for moisture curing hot melt adhesives in the examples 3 to 8 and the comparative examples 3 to 5 obtained in the above described manner. The results of the evaluations are also shown in the following tables 3 and 4. The respective signs of evaluations in the tables 3 and 4 have the same meanings as the signs of evaluations shown in the above described table 2.

As apparent from the tables 3 and 4, the compositions for moisture curing hot melt adhesives in the examples 3-a to 8 exhibit sufficiently superior moisture curing property and thermal stability. On the other hand, the compositions for moisture curing type hot melt adhesives in the comparative example 3-a and the comparative example 4 are significantly inferior in moisture curing property, while the compositions for moisture curing hot melt adhesives in the comparative example 3-b and the comparative example 5 are significantly inferior in thermal stability. Meanwhile, in the compositions for moisture curing hot melt adhesives in the comparative examples 3-c and 3-d, the catalyst evaporates at the time of mixing adhesives, so that the above described respective evaluations cannot be carried out.

TABLE 3

| | Example | | | | | | | |
|---|---|---|---|---|---|---|---|---|
| | 3-a | 3-b | 3-c | 4 | 5 | 6 | 7 | 8 |
| Urethane Prepolymer | | | | | | | | |
| (1) | 100 | 100 | 100 | 100 | 100 | 100 | | |
| (2) | | | | | | | 100 | |
| (3) | | | | | | | | 100 |
| Tackifying Resin | | | | | | | | |
| ARKON P-125 | 50 | 50 | 50 | | | | | |
| CLEARON P-115 | | | | 60 | | | | |
| FTR-6100 | | | | | 50 | | | |
| SUPER ESTER A-100 | | | | | | | 10 | 80 |
| ARKON P-100 | | | | | | 100 | | |
| Thermoplastic Polymer | | | | | | | | |
| BESTPLAST 708 | 30 | 30 | 30 | | | | | |
| EEA-704 | | | | 60 | | | | |
| EP-4043 | | | | | 20 | | | |
| CRATON G-1726 | | | | | | 30 | | |
| Catalyst | | | | | | | | |
| Catalyst of Formula(III) | 0.1 | 0.5 | 2.0 | 0.5 | | | 0.3 | |
| Catalyst of Formula(IV) | | | | | 0.4 | 0.3 | | 0.4 |
| DBTDL | | | | | | | | |
| SnOct | | | | | | | | |
| TEDA | | | | | | | | |
| PMDETA | | | | | | | | |
| Moisture Curing Property | △ | ⊚ | ⊚ | ⊚ | ⊚ | ○ | ⊚ | ⊚ |
| Thermal Stability | ⊚ | ⊚ | △ | ⊚ | ○ | ⊚ | ⊚ | ○ |

TABLE 4

| | Comparative Example | | | | | |
|---|---|---|---|---|---|---|
| | 3-a | 3-b | 3-c | 3-d | 4 | 5 |
| Urethane Prepolymer | | | | | | |
| (1) | 100 | 100 | 100 | 100 | | |
| (2) | | | | | 100 | |
| (3) | | | | | | 100 |
| Tackifying Resin | | | | | | |
| ARKON P-125 | 50 | 50 | 50 | 50 | | |
| CLEARON P-115 | | | | | | |
| FTR-6100 | | | | | | |
| SUPER ESTER A-100 | | | | | 10 | 10 |
| ARKON P-100 | | | | | | |
| Thermoplastic Polymer | | | | | | |
| BESTPLAST 708 | 30 | 30 | 30 | 30 | | |
| EEA-704 | | | | | | |
| EP-4043 | | | | | | |
| CRATON G-1726 | | | | | | |
| Catalyst | | | | | | |
| Catalyst of Formula(III) | | | | | | |
| Catalyst of Formula(IV) | | | | | | 6.0 |
| DBTDL | 0.5 | | | | | |
| SnOct | | 0.5 | | | | |
| TEDA | | | 0.5 | | | |
| PMDETA | | | | 0.5 | | |
| Moisture Curing Property | × | △ | — | — | × | ⊚ |
| Thermal Stability | △ | × | — | — | ⊚ | × |

What is claimed:

1. A moisture curing hot melt adhesive composition consisting essentially of:

100 parts by weight of a urethane prepolymer having an isocyanate group in its end which is obtained by the addition reaction of a polyol having a hydroxyl group in its molecular end and a polyisocyanate having an isocyanate group in its molecular end, said polyol having a hydroxyl group in its molecular end being a polyalkylene glycol; and 0.01 to 5 parts by weight of a compound having a structure represented by the following formula:

(wherein X, Y and Z in the formula (I) are alkyl groups or groups represented by the following formula (II), and at least one of X, Y and Z is a group represented by the following formula (II):

n in the formula (II) is an integer from 1 to 2, and $R_1$ and $R_2$ are hydrogen or alkyl groups).

2. The moisture curing hot melt adhesive composition according to claim 1, wherein said polyol is polyalkylene polyol, and the polyalkylene polyol contains polybutadiene polyol.

3. The moisture curing hot melt adhesive composition according to claim 2, wherein said polybutadiene polyol contains polybutadiene polyol hydride.

4. A moisture curing hot melt adhesive composition consisting essentially of:

100 parts by weight of a urethane prepolymer having an isocyanate group in its end which is obtained by the addition reaction of a polyol having a hydroxyl group in its molecular end and a polyisocyanate having an isocyanate group in its molecular end, said polyol having a hydroxyl group in its molecular end being a polyalkylene glycol;

a tackifying resin; and 0.01 to 5 parts by weight of a compound having a structure represented by the following formula:

(I)

(wherein X, Y and Z in the formula (I) are alkyl groups or groups represented by the following formula (II), and at least one of X, Y and Z is a group represented by the following formula (II):

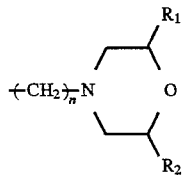
(II)

n in the formula (II) is an integer from 1 to 2, and $R_1$ and $R_2$ are hydrogen or alkyl groups).

5. The moisture curing hot melt adhesive composition according to claim 4, wherein said tackifying resin is at least one selected from a group consisting of rosin type resin, terpene type resin, aliphatic petroleum resin, alicyclic petroleum resin and aromatic petroleum resin.

6. The moisture curing hot melt adhesive composition according to claim 5, wherein the content of said tackifying resin is in the range of 5 to 200 parts by weight per 100 parts by weight of the urethane prepolymer.

7. The moisture curing hot melt adhesive composition according to claim 5, wherein the ring and ball softening point of said tackifying resin is 80° to 150° C.

8. A moisture curing hot melt adhesive composition consisting essentially of:

100 parts by weight of a urethane prepolymer having an isocyanate group in its end which is obtained by the addition reaction of a polyol having a hydroxyl group in its molecular end and a polyisocyanate having an isocyanate group in its molecular end, said polyol having a hydroxyl group in its molecular end being a polyalkylene glycol;

a tackifying resin;

a thermoplastic polymer; and 0.01 to 5 parts by weight of a compound having a structure represented by the following formula:

(I)

(wherein X, Y and Z in the formula (I) are alkyl groups or groups represented by the formula (II), and at least one of X, Y and Z is a group represented by the following formula (II):

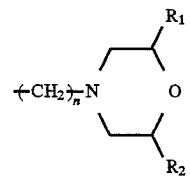
(II)

n in the formula (II) is an integer from 1 to 2, and $R_1$ and $R_2$ are hydrogen or alkyl groups).

9. The moisture curing hot melt adhesive composition according to claim 8, wherein said thermoplastic polymer is at least one selected from a group consisting of an A-(B-A)n block copolymer and an A-B radial block copolymer, where A is a polystyrene block, B is a rubber block, and n is from 1 through 50.

10. The moisture curing hot melt adhesive composition according to claim 8, wherein said thermoplastic polymer is a vinyl polymer containing ethylene-vinyl monomer copolymer whose melt index is approximately 0.1 to 1000 and which contains approximately 10 to 40 percent by weight of a vinyl monomer.

11. The moisture curing hot melt adhesive composition according to claim 8, wherein said thermoplastic polymer is an ethylene copolymer containing 20 to 50% by weight of vinyl monomer, 50 to 75% by weight of ethylene, and 3 to 20% by weight of carbon monoxide.

12. The moisture curing hot melt adhesive composition according to claim 8, wherein said thermoplastic polymer is polyolefin polymer.

13. The moisture curing hot melt adhesive composition according to any one of claims 8 to 12, wherein the content of said thermoplastic polymer is in the range of 10 to 100 parts by weight per 100 parts by weight of the urethane prepolymer.

14. The moisture curing hot melt adhesive composition according to claim 1, wherein said composition is thermally stable and becomes cured only when exposed to moisture.

15. The moisture curing hot melt adhesive composition according to claim 1, wherein said composition exhibits an increase in viscosity of less than 100% when heated in a sealed aluminum cartridge for 8 hours at a temperature of 130° C.

16. The moisture curing hot melt adhesive composition according to claim 1, wherein said composition requires a curing time of less than 24 hours at a temperature of 20° C. in an atmosphere of 65% relative humidity for bonding a plate of ABS resin of dimensions 4 cm×5 cm×0.3 cm coated with 50 g/m² of said composition to a steel plate of dimensions 40 mm×20 mm×0.8 mm so that no cohesive failure occurs when a suspension load of 100 g is applied to the steel plate at a temperature of 80° C.

17. The moisture curing hot melt adhesive composition according to claim 4, wherein said composition is thermally stable and becomes cured only when exposed to moisture.

18. The moisture curing hot melt adhesive composition according to claim 4, wherein said composition exhibits an increase in viscosity of less than 100% when heated in a sealed aluminum cartridge for 8 hours at a temperature of 130° C.

19. The moisture curing hot melt adhesive composition according to claim 4, wherein said composition requires a curing time of less than 24 hours at a temperature of 20° C. in an atmosphere of 65% relative humidity for bonding a plate of ABS resin of dimensions 4 cm×5 cm×0.3 cm coated with 50 g/m² of said composition to a steel plate of dimensions 40 mm×20 mm×0.8 mm so that no cohesive failure occurs when a suspension load of 100 g is applied to the steel plate at a temperature of 80° C.

20. The moisture curing hot melt adhesive composition according to claim 8, wherein said composition is thermally stable and becomes cured only when exposed to moisture.

21. The moisture curing hot melt adhesive composition according to claim 8, wherein said composition exhibits an increase in viscosity of less than 100% when heated in a sealed aluminum cartridge for 8 hours at a temperature of 130° C.

22. The moisture curing hot melt adhesive composition according to claim 8, wherein said composition requires a curing time of less than 24 hours at a temperature of 20° C.

in an atmosphere of 65% relative humidity for bonding a plate of ABS resin of dimensions 4 cm×5 cm×0.3 cm coated with 50 g/m² of said composition to a steel plate of dimensions 40 mm×20 mm×0.8 mm so that no cohesive failure occurs when a suspension load of 100 g is applied to the steel plate at a temperature of 80° C.

* * * * *